United States Patent [19]

Sato

[11] Patent Number: 5,083,982
[45] Date of Patent: Jan. 28, 1992

[54] SYSTEM FOR CONTROLLING A CONTINUOUSLY VARIABLE TRANSMISSION OF A MOTOR VEHICLE

[75] Inventor: Keiji Sato, Tokyo, Japan

[73] Assignee: Fuji Jukogyo Kabushiki Kaisha, Tokyo, Japan

[21] Appl. No.: 678,791

[22] Filed: Apr. 1, 1991

[30] Foreign Application Priority Data

Apr. 13, 1990 [JP] Japan ................... 2-98804

[51] Int. Cl.⁵ ............................................. F16H 59/00
[52] U.S. Cl. ............................. 474/28; 74/865; 364/424.01
[58] Field of Search ............ 474/18, 28, 69, 70; 74/865–869; 364/424.01

[56] References Cited

U.S. PATENT DOCUMENTS 4,752,277 6/1988 Morimoto ............... 474/28 X
4,778,435 10/1988 Sugaya et al. ............ 474/28
4,853,858 8/1989 Kumura ................ 474/28 X

FOREIGN PATENT DOCUMENTS 2-8718 1/1990 Japan .

Primary Examiner—Thuy M. Bui
Attorney, Agent, or Firm—Martin A. Farber

[57] ABSTRACT

A control unit of a CVT is provided to produce a basic exciting current for the dither exciting current fed to a solenoid of the solenoid operated control valve. A dither is added to the basic exciting current for producing the dither exciting current. A positive deviation and a negative deviation of the dither exciting current from the basic exciting current in one cycle of the dither is integrated for producing integrals. A correction value which renders the sum of said integrals zero is produced. The correction value is added to the dither so that a corrected dither exciting current is produced.

3 Claims, 4 Drawing Sheets

FIG. 2
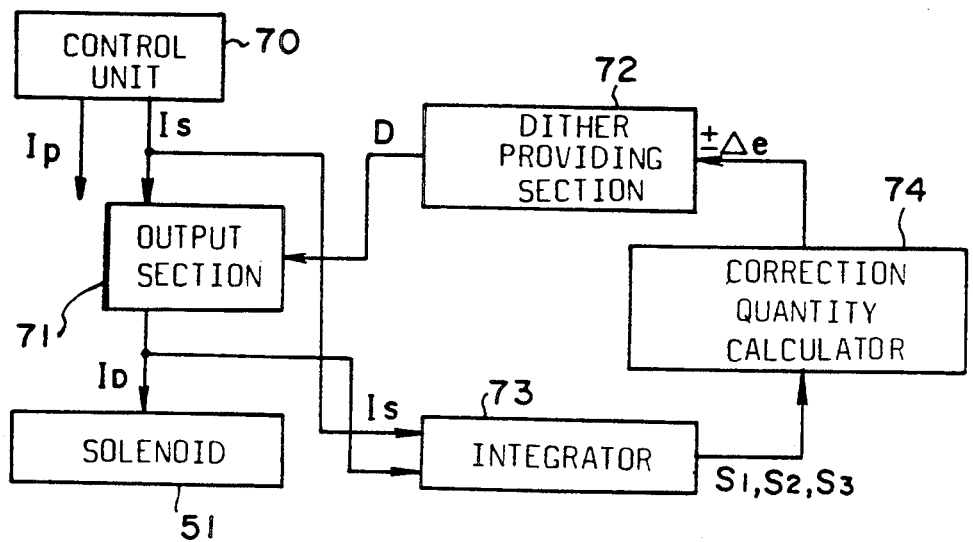
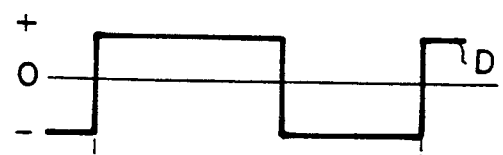
FIG. 3a
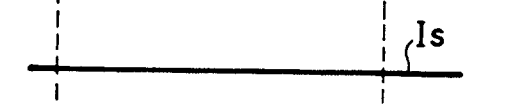
FIG. 3b
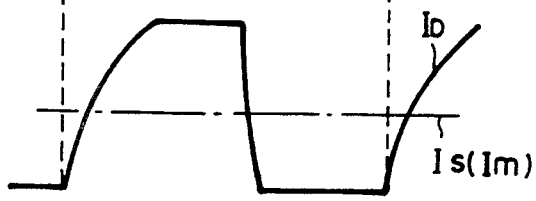
FIG. 3c

SYSTEM FOR CONTROLLING A CONTINUOUSLY VARIABLE TRANSMISSION OF A MOTOR VEHICLE

BACKGROUND OF THE INVENTION

The present invention relates to an electronic control system for controlling a secondary pressure and a transmission ratio by a solenoid operated valve of a continuously variable belt-drive transmission, and more particularly to the system for correcting a dither applied to a control current for the solenoid operated valve.

A hydraulic circuit of the continuously variable transmission (CVT) for a motor vehicle has the solenoid operated control valve to control a primary pressure and the secondary pressure in the circuit. The inventor of the present invention has disclosed an electronic control system in Japanese Patent Application 2-8718 where a solenoid is provided in the control valve, which is linearly operated by an analog exciting current. In order to reduce hysteresis movement of the valve, the dither which cyclically oscillates at a predetermined amplitude is added to a basic exciting current to produce a dither exciting current. The exciting current is applied to the solenoid.

The dither exciting current oscillates in a positive and a negative directions at an amplitude with respect to the exciting current, so that the mean exciting current is equal to the basic exciting current. Accordingly, the control valve constantly vibrates with pulsations of the dither exciting current, thereby reducing the hysteresis movement of the valve.

On the other hand, rising characteristics of the dither current largely changes with an impedance of the coil (solenoid) dependent on temperature of oil provided in the continuously variable transmission and with variation of the output voltage for the control unit dependent on balance of supply and consumption of power in the vehicle. Consequently, the mean exciting current largely changes, thereby deviating from the basic exciting current. Hence the solenoid operated control valve cannot be accurately controlled.

SUMMARY OF THE INVENTION

The object of the present invention is to provide an electronic control system for a solenoid operated valve wherein mean exciting current fed to a solenoid always coincides with basic exciting current, thereby controlling a continuously variable transmission with accuracy.

According to the present invention there is provided the system controlling a dither exciting current for the solenoid operated control valve in the continuously variable transmission for transmitting power of an internal combustion engine to driving wheels of a motor vehicle, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, a belt engaged with both pulleys, the control system having the solenoid for operating the solenoid operated control valve, and a control unit for producing a basic exciting current for the dither fed to the exciting current solenoid.

The system comprises dither means for providing the dither, calculating means for adding the dither to the basic exciting current for producing the dither exciting current, integration means for integrating deviation of the dither exciting current from the basic exciting current for producing a integral signal, correction means responsive to the integral signal for producing a correction value dependent on said integral signal, the dither means for correcting the dither with the correction value and for producing a corrected dither signal, and the calculating means responsive to the corrected dither for producing a corrected dither exciting current for exciting the solenoid.

In an aspect of the invention, the integration means integrates a positive and a negative deviations of the dither exciting current in one cycle of the dither, and the correction means produces the correction value which renders the sum of the integrals zero.

The other objects and features of the present invention will become understood from the following description with reference to the accompanying drawings.

BRIEF DESCRIPTION OF THE DRAWINGS

FIG. 2 shows a block diagram of a control system of the present invention;

FIGS. 3a to 3c show signals corresponding to a dither, basic exciting current and dither exciting current, respectively;

FIGS. 5a to 5e show a dither exciting signal and corrected dither signals; and FIG. 5d shows the corrected dither signal in a second embodiment of the present invention.

DETAILED DESCRIPTION OF THE PREFERRED EMBODIMENTS

Figure 1:
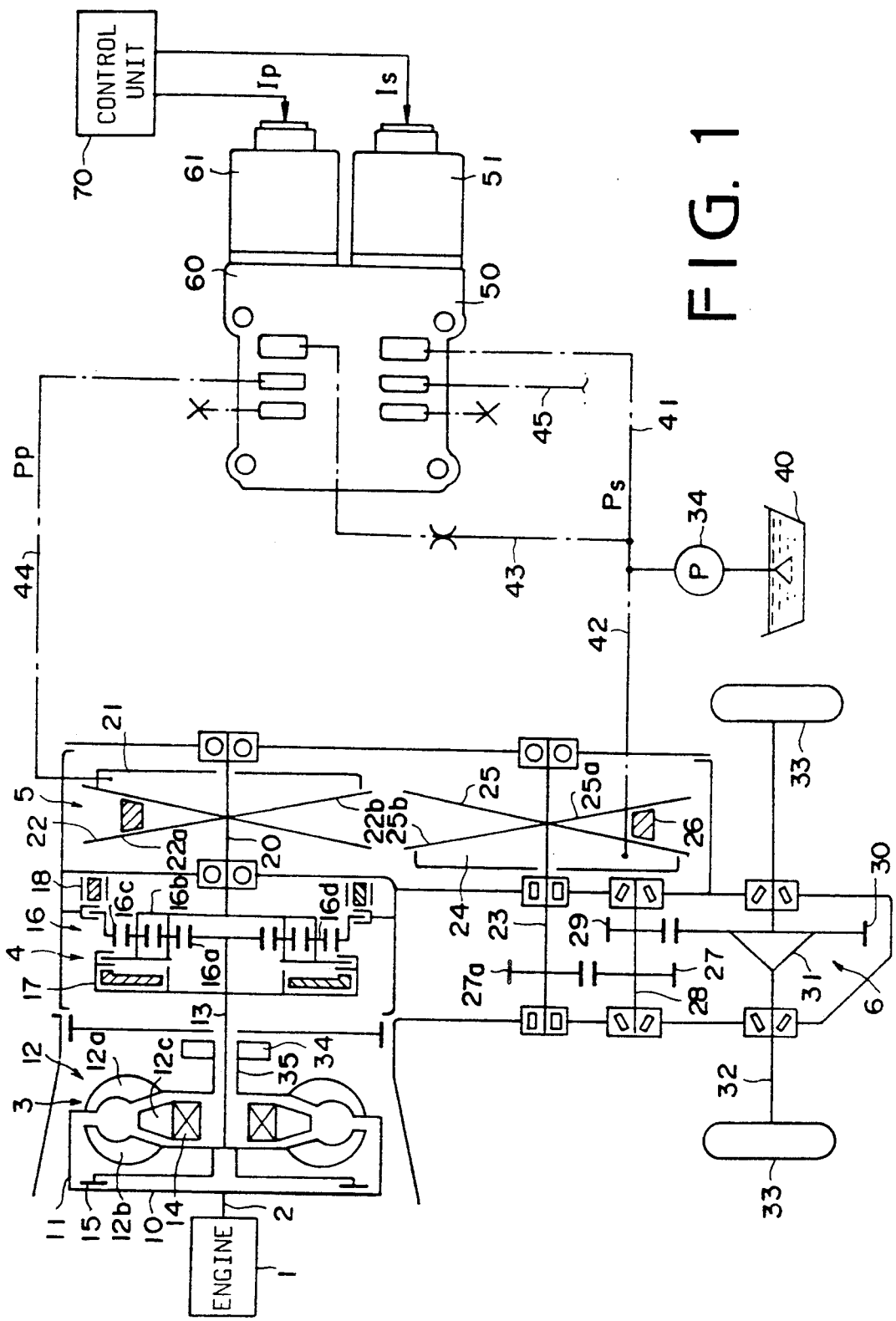
FIG. 1 shows a schematic diagram of a continuously variable belt-drive transmission to which the present invention is applied.

FIG. 1 shows a power transmission system with a continuously variable belt-drive transmission 5 for a motor vehicle, to which the present invention is applied. An engine 1 is mounted on the motor vehicle at a front portion thereof. The power transmission system comprises a torque converter device 3, a selector device 4, the continuously variable belt-drive transmission 5, and a final reduction device 6.

The torque converter device 3 has a torque converter 12 with a lockup clutch 15. A drive plate 10 is fixed to a crankshaft 2 of the engine 1. A converter cover 11 is secured to the drive plate 10. The torque converter 12 comprises an impeller 12a integral with the converter cover 11, a turbine 12b connected to an input shaft 13, and a stator 12c connected to a one-way clutch 14. The lockup clutch 15 is disposed between the converter cover 11 and the torque converter 12 for making a contact with the cover 11.

The selector device 4 comprises a planetary gear 16 having a pair of pinions 16d, and a sun gear 16a mounted on the input shaft 13. The pinions 16d are supported on a carrier 16b. The sun gear 16a is engaged with a ring gear 16c through the pinions 16d. A forward clutch 17 is disposed between the sun gear 16a and the carrier 16b. A reverse brake 18 is disposed between the ring gear 16c and a main case. At forward driving such as a drive range (D) selection, the forward clutch 17 is engaged to lock the sun gear 16a and the carrier 16b. At reverse driving, the reverse brake 18 is engaged to lock the ring gear 16c for reversely rotating the carrier 16b.

The belt-drive transmission 5 has a main shaft 20 engaged with the carrier 16b and an output shaft 23 provided in parallel with the main shaft 20. A primary pulley 22 and a secondary pulley 25 are mounted on the main shaft 20 and the output shaft 23, respectively. A fixed conical disk 22a of the primary pulley 22 is integral with the main shaft 20 and an axially movable conical disc 22b is axially slidably mounted on the main shaft 20. The movable conical disc 22b also slides in a primary cylinder 21 formed on the main shaft 20 to provide a servo device.

A fixed conical disc 25a of a secondary pulley 25 is formed on the output shaft 23 opposite the movable conical disc 22b, and a movable conical disc 25b is slidably mounted on the shaft 23 opposite the disc 22a. The movable conical disc 25b has a cylindrical portion which is slidably engaged in a secondary cylinder 24 of the output shaft 23 to serve as the servo device. A drive belt 26 engages with the primary pulley 22 and the secondary pulley 25. The cylinder 21 of the drive pulley 22 is so designed that a pressure receiving area thereof is larger than that of the cylinder 24 of the secondary pulley 25. Thus, the effective diameter of the pulleys, that is a running diameter of the belt 26 on the pulleys is varied dependent on driving conditions.

A drive gear 27a of the final reduction device 6 is secured to the output shaft 23 and engages with an intermediate reduction gear 27 on an intermediate shaft 28. An intermediate gear 29 on the shaft 28 engages with a final reduction gear 30. Rotation of the final reduction gear 30 is transmitted to axles 32 of vehicle driving wheels 33 through a differential 31.

Adjacent the torque converter 12, an oil pump 34 is provided for supplying high pressurized oil for the transmission 5. An oil pump drive shaft 35 is connected to an impeller 12a and is operatively connected with the converter cover 11. The oil pump 34 is a roller vane type pump having a plurality of inlet and outlet ports as a variable displacement pump. Oil in an oil reservoir 40 is supplied to a secondary pressure control valve 50 through a passage 41 by the pump 34 for producing a predetermined secondary pressure Ps. An oil passage 42 connected to the passage 41 is communicated with the cylinder 24 of the secondary pulley 25, so that the secondary pressure Ps is applied to the cylinder 24. The passage 41 is further communicated with a primary pressure control valve 60 through a passage 43 so that the secondary pressure Ps is applied to the primary pressure control valve 60. The cylinder 21 of primary pulley 22 is applied with a primary pressure Pp through the primary pressure control valve 60 and a passage 44.

The secondary pressure control valve 50 is a proportional solenoid operated relief valve type having a proportional solenoid 51.

The proportional solenoid 51 is operated by exciting current Is supplied from a control unit 70. The current Is produces electromagnetic force which acts to urge a spool of the secondary valve 50. The secondary pressure Ps is automatically set to a value at which the secondary pressure Ps balances with the sum of the electromagnetic force and a spring force applied to the spool. Namely, the secondary pressure Ps is controlled by the current Is.

The primary pressure control valve 60 is a proportional solenoid operated reducing valve type having a proportional solenoid 61.

The solenoid 61 is also operated by solenoid current Ip from the control unit 70. The current Ip produces electromagnetic force to control the primary pressure Pp in the same manner as the secondary pressure control valve 50. A comparatively high lubricating pressure is produced in a drain passage 45 of the secondary pressure control valve 50. The lubricating pressure is applied to the torque converter 12, the selector device 4 and the belt 26.

Referring to FIG. 2, an electronic control system of the present invention includes the control unit 70. The control unit 70 calculates a desired secondary pressure Pss in accordance with various engine operating conditions and driving conditions of the vehicle, and feeds the basic exciting current Is, which is proportional to the desired secondary pressure Pss, to an output section 71. The output section 71 is applied with a dither D from a dither providing section 72. The dither D is added to the basic exciting current Is to produce a dither exciting current ID which is applied to the proportional solenoid 51.

The dither D is in the form of a pulse signal having a predetermined cycle as shown in FIG. 3a. The basic exciting current Is is linear as shown is FIG. 3b. FIG. 3c shows a dither exciting current ID which has rising characteristics with a time lag of first order dependent on a time constant in the circuit. The characteristics change with operations such as coil impedance of the solenoid 61.

A system for stabilizing the mean exciting current Im is described. The control system has an integrator 73 to which the basic exciting current Is from the control unit 70 and the dither exciting current ID from the output section 71 are applied. The integrator 73 calculates deviation of the dither exciting current ID from the basic exciting current Is in one cycle of the dither D. Namely, an integral S1 shown in FIG. 4 by a hatched region in the positive side of the basic exciting current Is and integrals S2 and S3 shown by the hatched regions in the negative side are calculated as follows.

$$S1 = \int_{t1}^{t2} (ID - Is)dt$$

$$S2 = \int_{t2}^{t3} (Is - ID)dt$$

$$S3 = \int_{t0}^{t1} (Is - ID)dt$$

Figure 5A:
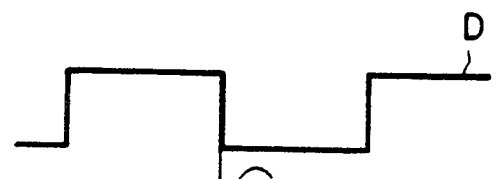
Figure 5B:
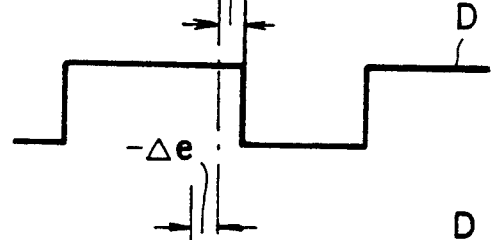

In order to coincide the mean exciting current Im with the basic exciting current Is, the system operates to correct a duty ratio of the dither D such that the deviation integral becomes zero, as described below. The integrals S1, S2 and S3 are applied to a correction quantity calculator 74 where a correction quantity Δe of the duty ratio e is calculated based on a sum S of the integrals S1, S2 and S3 (S=S1−S2−S3). When the sum S is larger than zero (S>0), −Δe is calculated and applied to the dither providing section 72. To the contrary, when the sum S is smaller than zero (S<0), +Δe is fed (FIGS. 5a to 5c).

In operation, the torque of the engine 1 is transmitted to the main shaft 20 of the continuously variable transmission 5 through the torque converter device 3 and the selector device 4. The torque is further transmitted to the driving wheels 33 of the vehicle through the output shaft 23 at a transmission ratio dependent on the positions of the primary pulley 22, secondary pulley 25 and the belt 26 of the transmission 5. Hence the vehicle is driven. At the same time, the basic exciting current Is which corresponds to the desired secondary pressure Pss is determined in the control unit 70 and applied with the dither D so that the dither exciting current ID is applied to the proportional solenoid 51. Consequently, the secondary pressure control valve 50 is accurately operated so as to converge the secondary pressure Ps at the desired pressure Pss.

Figure 4:
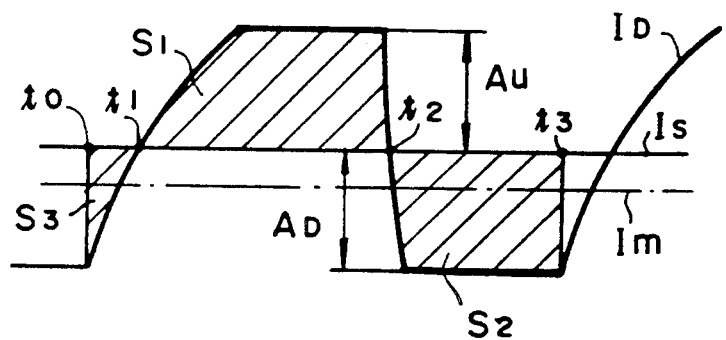
FIG. 4 is a diagram showing integrals of deviation of the dither exciting current from the basic exciting current.

The dither exciting current ID from the output section 71 as well as the basic exciting current Is is fed to the integrator 73 so that the deviation integrals in one cycle of the current ID from the current Is are calculated. The correction quantity calculator 74 determines whether the mean current Im of the dither exciting current ID is equal to the basic exciting current Is in dependency on the value of the sum S of the integrals. When the temperature of the solenoid is low, the coil impedance is increased. Accordingly, the dither exciting current ID gradually rises so that the mean current Im deviates to a smaller value than that of the basic exciting current Is as shown in FIG. 4. Since the sum S becomes smaller than zero (S<0), the duty ratio e of the dither D is increased by the quantity Δe as shown in FIG. 5b. As a result, the integral S1 becomes larger than the integral S2 so that the level of the mean current Im is increased. The proportional solenoid 51 is applied with the dither exciting current ID which exactly corresponds to the basic exciting current Is, thereby accurately operating the solenoid valve 50.

Figure 5C:
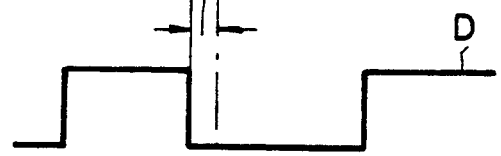

On the other hand, when the mean exciting current Im is larger than the solenoid current Is, the duty ratio e is decreased by the quantity Δe as shown in FIG. 5c so that the mean current Im coincides with the basic exciting current Is.

The dither D added to the basic exciting current Ip applied to the solenoid 61 of the primary pressure control valve 60 is corrected in the same manner.

Figure 5D:
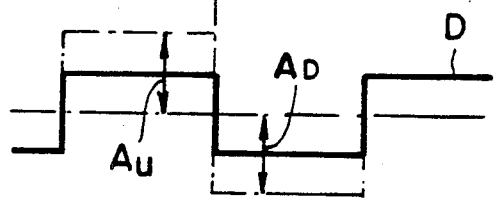

The present invention may be modified to correct the amplitude of the dither exciting current ID instead of the duty ratio. As shown is FIG. 5d, the amplitude AU in the positive direction or the amplitude AD in the negative direction are so corrected as to render the sum S of the integrals zero.

From the foregoing, it will be understood that the present invention provides an electronic control system for correcting the dither applied to the solenoid operated valve provided to control the oil in the hydraulic circuit of the continuously variable transmission. Accordingly, although the temperature of the oil in the hydraulic circuit and the unit output voltage may vary, an appropriate dither current is produced, thereby accurately controlling the valves. Since the dither is appropriately corrected in dependency on the ingegral sum integrals of the dither exciting current deviation from the basic exciting current, the mean exciting current always coincides with the basic exciting current. The dither is easily and properly corrected by changing the duty ratio or an amplitude thereof.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a system for controlling a solenoid operated control valve in a continuously variable transmission to transmit power of an internal combustion engine to driving wheels of a motor vehicle, said transmission having a drive pulley including a hydraulically shiftable disc and a first hydraulic cylinder for shifting said disc, a driven pulley including a hydraulically shiftable disc and a second hydraulic cylinder for operating said disc of said driven pulley, a belt engaged with both pulleys, said control system having a solenoid for operating said solenoid operated control valve, and a control unit for controlling dither exciting current fed to said solenoid and for producing a basic exciting current signal, an improvement of the system which comprises:

dither means responsive to said basic exciting current signal for providing a dither and for generating a dither signal;

calculating means responsive to said dither signal for adding said dither to said basic exciting current and for producing said dither exciting current signal;

integration means responsive to said dither exciting current signal for integrating deviation of said dither exciting current from said basic exciting current and for producing a integral signal;

correction means responsive to said integral signal for producing a correction value dependent on said integrals and for generating a correction signal;

said dither means responsive to said correction signal for correcting said dither and for producing a corrected dither signal; and said calculating means responsive to said corrected dither signal for producing a corrected dither exciting current for exciting said solenoid so as to accurately control valve without fluctuation.

2. The system according to claim 1, wherein said integration means integrates positive and negative deviations of the dither exciting current in one cycle of the dither.

3. The system according to claim 2, wherein said correction means produces the correction value which renders the sum of said integrals zero.

* * * * *